United States Patent [19]
Ribeiro Pinto

[11] 4,177,953
[45] Dec. 11, 1979

[54] CHOPPING-RAISING-CLEANING ASSEMBLY FOR SUGAR CANE HARVESTING MACHINES

[75] Inventor: Luiz Antonio C. Ribeiro Pinto, Ribeirão Preto, Brazil

[73] Assignee: Santal Equipamentos S. A. Comercio E. Industria, Sao Paulo, Brazil

[21] Appl. No.: 891,282

[22] Filed: Mar. 29, 1978

[30] Foreign Application Priority Data

Aug. 26, 1977 [BR] Brazil .................................. 7705738
Nov. 30, 1977 [BR] Brazil .................................. 7707999

[51] Int. Cl.² ............................................ B02C 13/288
[52] U.S. Cl. .................................... 241/58; 241/101.7; 241/186.2; 241/189 A
[58] Field of Search ................. 56/13.3; 198/641, 642; 302/32, 37, 38, 34; 241/55, 56, 58, 101.7, 186 R, 189 R, 186.2, 186.3, 189 A

[56] References Cited
U.S. PATENT DOCUMENTS

| | | | |
|---|---|---|---|
| 1,575,853 | 3/1926 | MacGregor | 241/55 |
| 2,669,271 | 2/1954 | Treckmann | 241/55 |
| 2,701,105 | 2/1955 | Edwards | 241/186 R X |
| 2,946,629 | 7/1960 | Headley | 302/37 |
| 3,925,199 | 12/1975 | Quick | 56/13.3 X |
| 3,946,950 | 3/1976 | Graf | 241/55 X |

*Primary Examiner*—Mark Rosenbaum
*Attorney, Agent, or Firm*—Darby & Darby

[57] ABSTRACT

A chopping-raising-cleaning assembly for sugar cane harvesting machines in which the operations of cutting the cane into billets, cleaning of said billets and elevation and transport of the billets to a loading position is out by a billet chopping-throwing device in which one rotative or two fixed discharge ducts are attached. According to the present invention the cane is chopped into billets which are thrown into a cylinder having internal rotative fins that move the billets, throwing them upwardly through a tangential opening in the cylinder at a speed sufficient to allow the billets to go up through the corresponding duct, allowing the unloading of the billets on the transport vehicles. The cleaning of the billets is aerodynamically carried out assisted by an extracting fan disposed in each duct.

25 Claims, 8 Drawing Figures

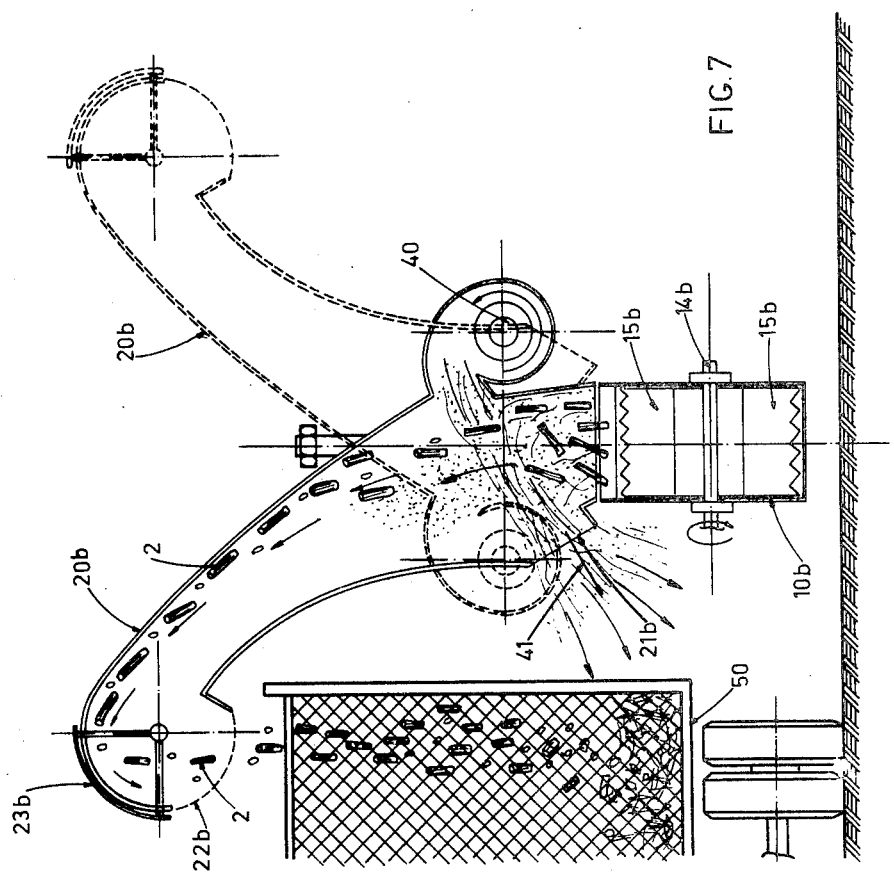

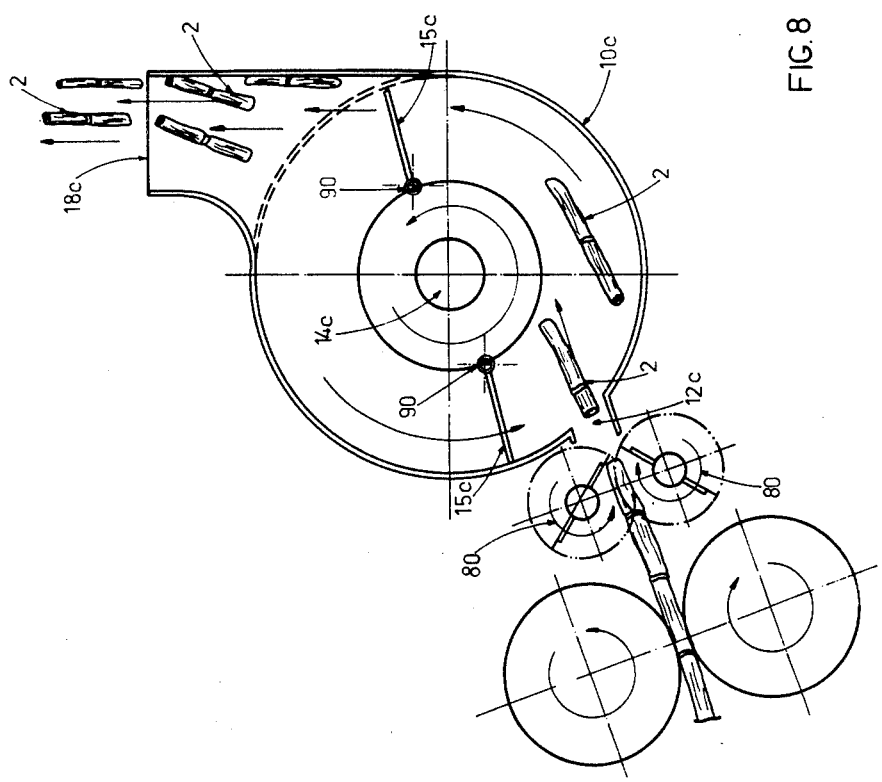

CHOPPING-RAISING-CLEANING ASSEMBLY FOR SUGAR CANE HARVESTING MACHINES

The present invention relates to a chopping-raising-cleaning assembly, particularly suitable to be installed in harvesting machines of sugar cane or of similar products of the cutting, chopping, cleaning and loading type, which is able to effect the chopping, cleaning and loading operations, in place of the conventional systems which employ mechanisms for chopping, cleaning and raising, the latter operation being carried out by mats comprising chains and sliding slivers.

As it is known by the experts in the art, harvesting machines of sugar cane (or of similar products) of the cutting, chopping, cleaning, loading type effect basically and successively the following operations: (a) harvesting of the cane together with the cutting and removing of its upper leaf-bearing tip; (b) cutting of the cane at its base, close to the ground; (c) forwarding of the cane, still complete, to the chopping and cleaning mechanisms; (d) chopping of the cane into billets, generally 20 to 30 cm long; (e) cleaning of the billets, separating straw, land and debris; and (f) raising and guiding of the billets to a position that allows their storage (during short period of time) and loading on a transport vehicle that accompanies the harvesting machine as it moves.

Traditionally, the harvesting operations, upper cutting, base cutting, forwarding to the chopping and cleaning mechanisms and the re-chopping of the cane into billets is carried out by rotating discs provided with knives and/or cylinders, also rotating, provided with fins, teeth and/or knives.

The cleaning operation of the billets is normally carried out by a cleaning means which is in the form of one or more fans and/or aspirators which produce air streams over the billets, throwing only part of the debris and dirt upwardly to the atmosphere and allowing that part of such debris drops again over the vehicle for transporting the billets, thereby jeopardizing the cleaning of the cane and contaminating the work environment.

The operations of raising and guiding of the billets to the position of storage and unloading are conventionally carried out by one or more tilted raising mats comprising guides, chains and metallic slivers.

With the purpose of reducing considerably the number of moving parts of a cane harvesting machine, with the consequent reduction of wear, maintenance, risks of cracks, weight, cost and consumption of power, in addition to a better cutting and cleaning of the cane billets (with previous need of burning of the straw) and an easy unloading of the billets from one or the other side of the harvester, the applicant has developed the present chopping-raising-cleaning assembly.

The assembly of the present invention allows that the operations of re-chopping of the cane into billets, cleaning of such billets and elevation and transport of the billets to a loading position be carried out by a billet chopping-throwing means, in which two fixed guide-ducts are attached, in each of whose upper parts a small billet hopper is formed.

In such above-mentioned assembly, the cane, when chopped, is thrown into a cylinder having one or more interior fins that move the billets, throwing them upwardly through tangential openings in the side wall of the cylinder at a speed sufficient to allow that said billets go up through the interior of one or other fixed ducts and reach the small upper hoppers provided with deflectors for regulating the unloading opening, allowing the unloading of the chopped cane over the transport vehicles.

Further with respect to this assembly, for the harvest to be able to unload the billets through both sides (left and right), the rotation of the knives (chopping knives) and of the throwing fins (which are connected to the same shaft) is so that in one sense of rotation the billets are thrown through the right guide-duct, while in a reverse sense, the billets are thrown through the left guide-duct. The cleaning of the billets is aerodynamically carried out assisted by the respective extracting fan of each of the ducts. In such a system, there is utilized, for the separation of the straw and debris, the difference in the aerodynamic strength/density rate existing between the billets and the straw and the debris. This produces a better cleaning action.

According to another embodiment of the present invention, designed to further simplify the previously described system, to make the throwing of the billets uniform and to improve the cleaning of same, the two guide-ducts, as previously employed, are replaced by a single rotative duct around the vertical axis of the assembly and provided, in the lower part, with a fan for cleaning and, in the upper part, with a small deflector for the billets.

The system of cutting and throwing the billets is basically the same as that of the previously described embodiment, but the tangential outlets of the cylinder was replaced by a unique upper outlet which is designed to allow the throwing, that is, crossed throwing, of the billets in a direction already inclined to one or other side of the machine, depending on the sense of rotation given to the throwing fins when the feeding of the cane is made parallel to the axis of rotation of the fins, or to allow the exit of the billets from the cylinder in a path close to vertical when the cane is fed to the cylinder in a direction transverse to the axis of rotation of the throwing fins. The vertical path of exit of the billets from the cylinder is smoothly controllable to one or other side of the machine, depending solely on the positioning of the duct and no longer on the sense of rotation of the fins, which rotation in this case remains unchanged.

These and other characteristics of the chopping-raising-cleaning assembly of the present invention will be better understood with the following description in connection with the attached drawings, which are given for illustrative purposes:

In the drawings:

FIG. 7 represents an axial vertical section of the chopping-raising assembly, complete, utilizing the chopping-throwing assembly of FIG. 6; and FIG. 8 represents another arrangement for the throwing (cylinder) means of FIG. 6.

Figure 1:
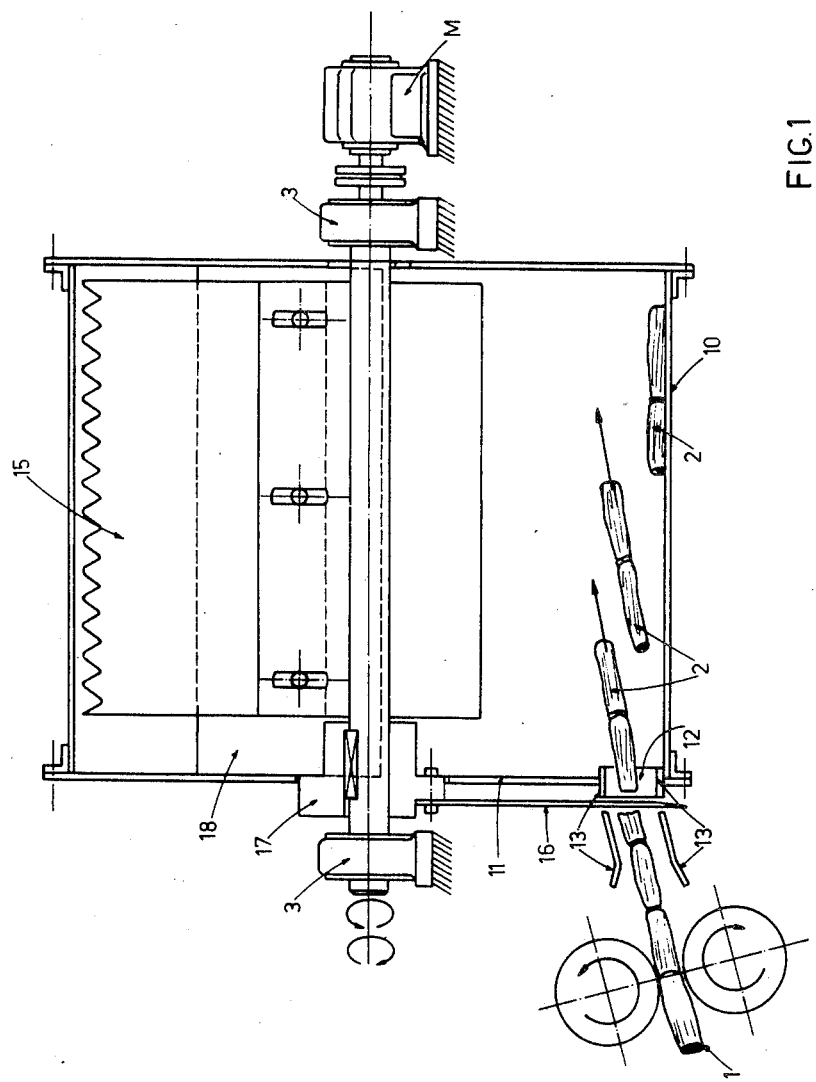
FIG. 1 is an axial vertical section of the chopping-throwing means utilizing two guide-ducts and including a chopping knife and a throwing fin.
Figure 2:
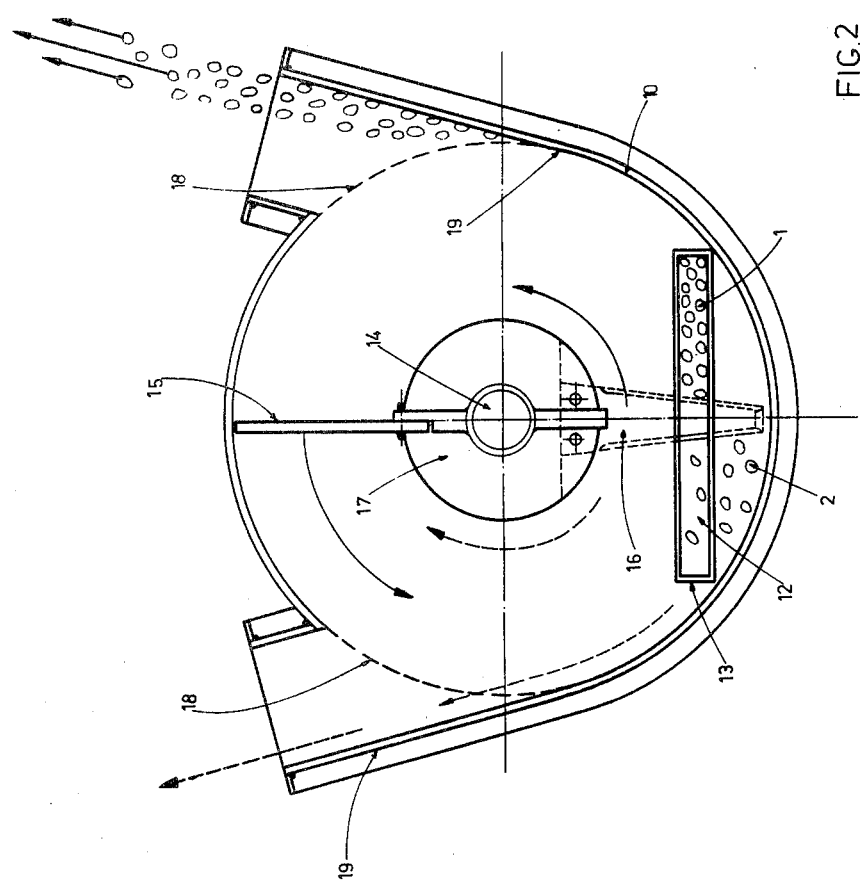
FIG. 2 represents a radial vertical section of said assembly of FIG. 1.

In accordance with FIGS. 1 and 2, there is illustrated cane 1 being fed through the feeding opening 12 provided in the forward cover 11 of a cylinder 10 and provided with guides 13 that operate in conjunction with a counter-cutting means 16.

The linear speed of the feeding of the cane 1 is synchronized with the rotation of a shaft 14 dirven by a motor M and supported on bearings 3 so that the cane is contacted by knife 16 at each advancement of 20 to 30 cm, so that the billets 2 have such same general dimensions.

The knife 16 is fixed to the shaft 14, externally to the cylinder 10, by means of a support 17.

In passing through the feeding opening 12 the billets cut by the knife proceed in their path in the interior of the cyliner 10. When they reach the end rear face of cylinder 10, where such billets accumulate at the bottom of the latter. The cut billets are immediately thereafter dragged by a throwing fin 15, mounted on shaft 14 (in the case of just one fin) radially 180° from the knife 16 by means of a suitable support. The end edge of the fin is provided with teeth of lessen the friction and the risks of "glutting" with the straw.

The billets read one of the outlet openings 18 formed in the body of cylinder 10, each of which openings is provided with a tangential guide 19. The billets are dragged in circular movement by the throwing fin 15 and leave the cylinder, being thrown tangentially at high speed according to the direction of the corresponding guide 19. The initial speed of the billets is approximately equal to the peripheral speed of the tip of the throwing fin 15.

Figure 3:
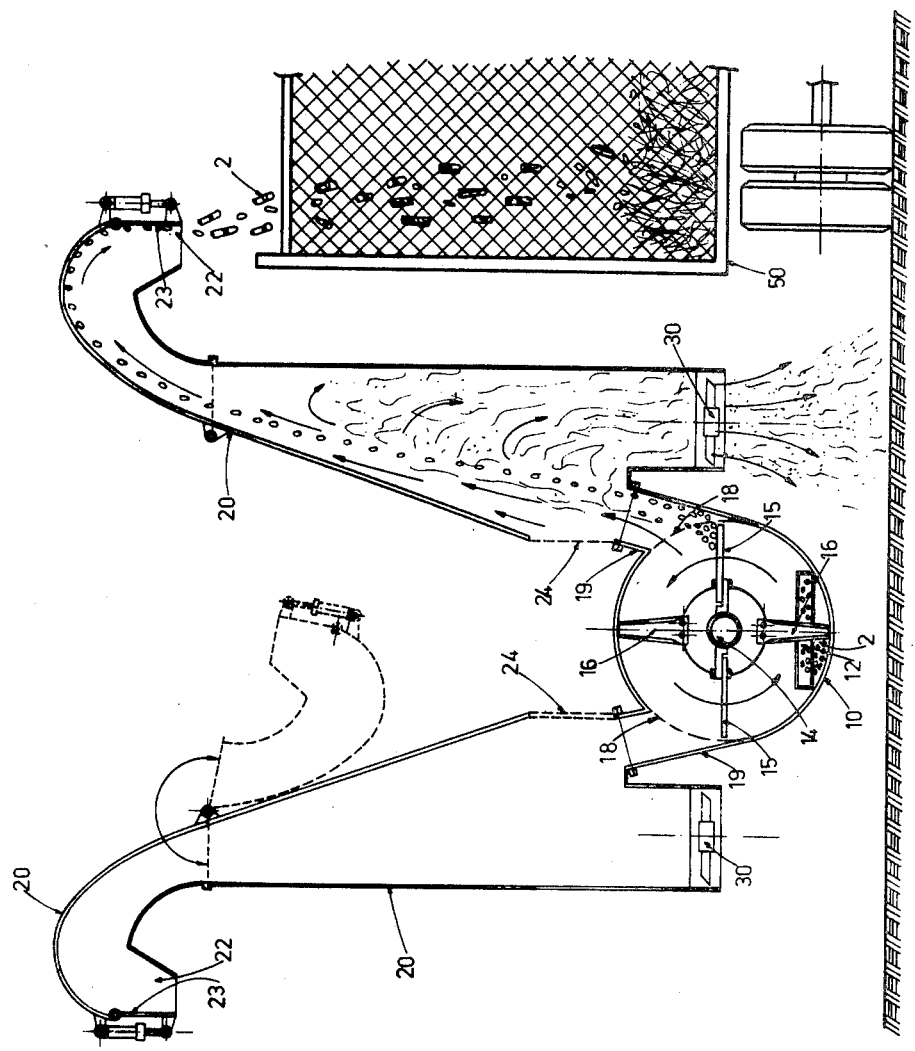
FIG. 3 is a radial vertical section of the chopping-raising-cleaning assembly with two guide-ducts, which uses two chopping knives and two throwing fins.

In FIG. 3 there is illustrated a complete chopping-raising-cleaning assembly with two chopping knives 16 and two throwing fins 15.

The rotation of shaft 14 and the dimensions of cylinder 10 and fins 15 are chosen to provide a throwing speed (in the order of 12 m/sec) such that allows the billets to go up in the interior of one of the ducts 20, at a speed sufficient to overcome the friction of the air and the contact with the walls of the ducts, in order to reach the upper part of the latter. The billets follow the upper contour of the ducts to leave outlet 22 without returning to the interior of the duct.

Each duct 20 still has, in its upper outlet 22 a deflector 23 hydraulically positioned by the operator, in order to allow the guiding of unloading of billets 2 into the center or sides of the transport vehicle 50 which accompanies the harvesting machine during the harvesting work thereof.

Aspirators 30, such as fans, are mounted at the bottom of ducts 20 and aspirate and expell downwardly, toward the ground, not only air which is impelled by the cylinder-fins assembly which functions also as a centrifugal fan through the outlet openings 18, but also an additional quantity of air aspirated to the interior of the ducts 20 through their lateral, internal openings 24.

The quick movement of the billets through the air causes not only the separation of the straw adhered, but also of all the impurities of higher specific density (dust, vegetal debris, land and roots) which are dragged and expelled to ground together with the air aspirated by aspirators 30.

Thus, only the clean billets reach the top of ducts 20 to be unloaded over the transport vehicle 50.

To facilitate the transport of the harvesting machine the ducts 20 have links to their upper quarter, which links allow bending of the ducts such as indicated by the dashed position in FIG. 3, reducing the dimensions of the assembly.

As the assembly is prefectly symmetric with respect to the central vertical plane, a reversal of the sense of rotation of shaft 14 changes the side of loading of the billets.

In FIG. 3, shaft 14 rotates anti-clockwise and the billets are expelled to the right side of the harvester, the left duct 20 remaining idle. When the shaft 14 rotates clockwise, the billets will be expelled to the left side of the harvester, the right duct remaining inactive.

With the successive changes of side of unloading, due to the back-and-forth movement along the cane lanes, the knives 16 which are also symmetrical, with cutting edges on both sides, the fins 15, the gutters and the cylinder will have substantially equal and uniform wear in all the working surfaces, increasing the useful life thereof.

Figure 4:
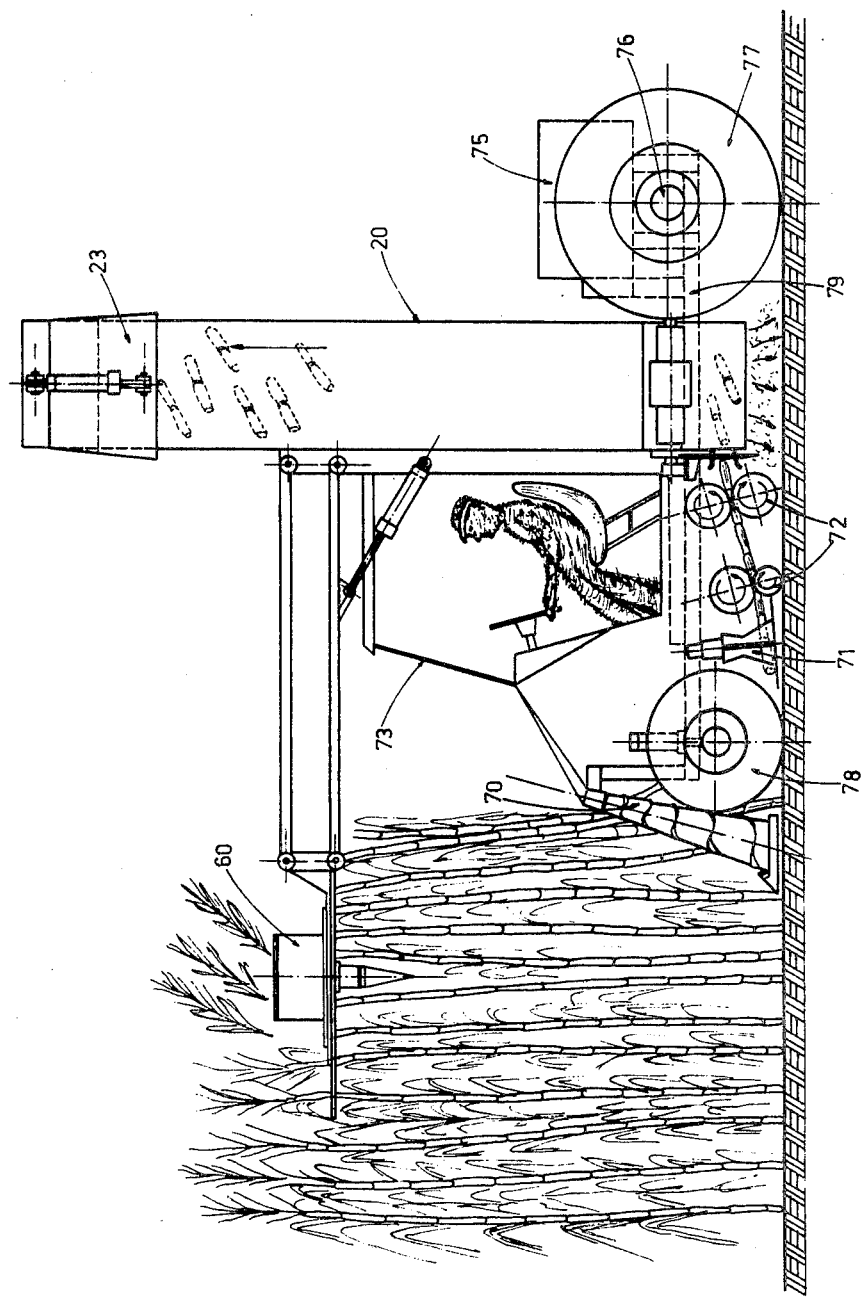
FIG. 4 illustrates, in a schematic way, a further embodiment of a sugar cane harvester utilizing the assembly illustrated in FIG. 3.

In FIG. 4 there is illustrated a cane harvester embodying the chopping-raising-cleaning assembly illustrated in FIG. 3. Such harvester incorporates a cutting mechanism 60 for cane tips, hydraulically positioned; harvesting spirals 70 for tombed cane; mechanisms (rotative discs) 71 for cutting cane; rotative feeding rollers 72; operation cabin 73; motor, transmission and its accessories 75; and driving shaft, rear, 76; driving wheels 77; directional wheel 78 and frame 79.

Figure 5:
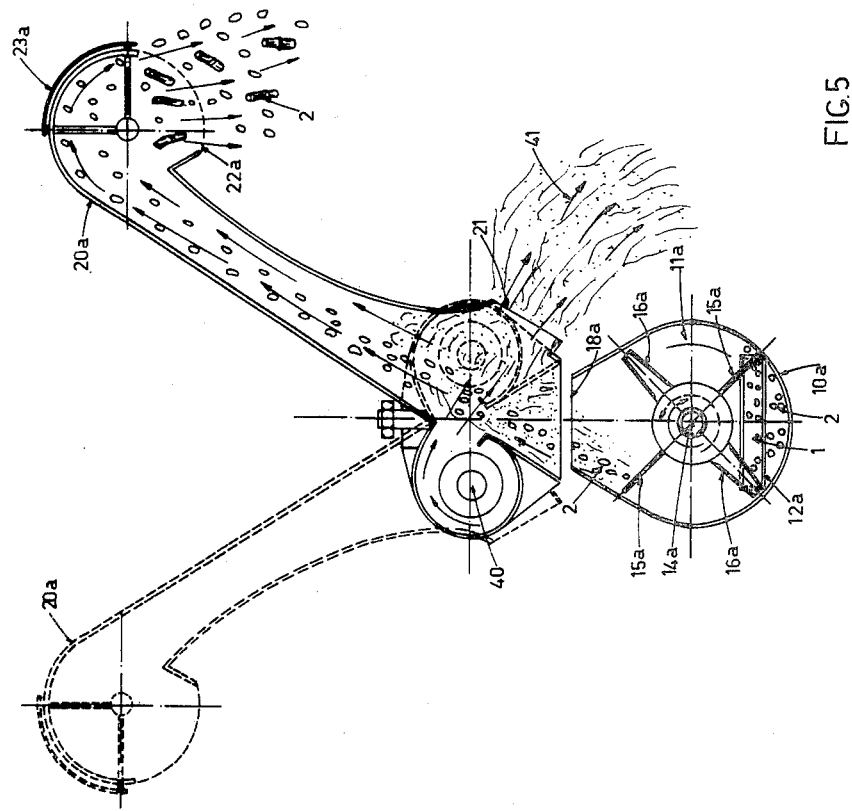
FIG. 5 is a radial vertical section of a chopping-raising-cleaning assembly, in another embodiment thereof, employing two chopping knives and two throwing fins, the guide-duct being represented, in full lines, for unloading at right and, in dashed lines, for unloading at left, the feeding of the cane into the throwing cylinder being made parallel to the axis of rotation of the fins.

With reference now to FIG. 5, which illustrates another embodiment of the chopping-raising-cleaning assembly, cane 1, or other similar product, after being harvested by the machine, is taken to the chopping-raising-cleaning assembly through suitable mechanisms (not illustrated), to be introduced into the feeding opening 12a provided in the forward cover 11a of the throwing cylinder 10a, said opening 12a being provided with guides (not illustrated) which operate as counter-cutting means, as previously described with respect of FIGS. 1-3.

Cylinder 10a is centrally and longitudinally crossed by a driven shaft 14a the rotation of which is synchronized with the linear speed of the feeding of the cane through opening 12a. To shaft 14a are fixed, internally to cylinder 10a, one or more fins 15a and, externally, or even internally, one or more cutting knives 16a provided with cutting edges on both sides.

The cane being fed is cut by the knife (or knives) at each advancement of 20 to 30 cm. The cut billets 2, when passing through feeding opening 12a, proceed their way in the interior of cylinder 10a, accumulating slightly at the bottom of the latter until they are dragged upwardly by a throwing fin 15a.

In reaching the unique outlet opening (upper opening) 18a of cylinder 10a, the billets 2 leave the cylinder, and are thrown at high speed to the interior of guide-duct 20a positioned in accordance with the sense of rotation chosen for shaft 14a, that is, in accordance with the side of the machine chosen for unloading the billets.

In FIG. 5, illustrating the feeding system of cane parallel to the axis of rotation 14a of fins 15a, guide-duct 20a is overlooking the right side and shaft 14a rotates clockwise. As can be seen from that Figure, rotating duct 20a 180° around a vertical axis and inverting the rotation of the throwing fins, the billets 2 will be thrown to the left, according to a path that intersects the unloading path at right immediately after the outlet of the upper opening 18a of cylinder 10a.

For the billets to follow a path parallel to the axis of duct 20a when they leave cylinder 10a, an upper part of the cylindrical surface of the latter is eliminated and replaced by a sort of hopper with inverted trapezoidal cross section, with the smaller part open (opening 18a) and with the lateral faces tangential to said cylindrical surface of the cylinder 10a and parallel to the axis of duct 20a in the corresponding end operation positions of the duct.

Duct 20a incorporates, externally to its back, next to the lower end or base thereof, a compartment in communication with the interior of duct 20a housing a fan 40 that causes a forced air stream 41 transverse or approximately transverse to the path of billets 2 in the interior of the duct. This current or stream of air which is unloaded through an opening 21 in the wall of the duct, opposite to fan 40, causes the dragging of the straw and debris to outside the duct, laterally to the machine and toward the ground.

Evidently, the assembly is sized to transmit a throwing to billets 2 sufficiently to cause said billets to go up through the interior of the duct 20a, reaching the upper bent part of the latter, and be thrown through 22a without returning to the interior of the duct.

Upper opening 22a of duct 20a can totally or partially be closed by a moving cover 23a controlled by the operator through suitable means not illustrated. When fully closed, cover 23a forms a small hopper for the bullets.

Said cover 23a also functions as a deflector, allowing the guiding of the unloading of billets 2 to the center or to outside of vehicle 50 of transport of the sticks that accompanies the movement of the harvesting machine.

Test carried out with such assembly provided highly satisfactory results.

What one can observe in the development of the experiments is that, for a good throwing of the chopped cane, there is a need for feeding the throwing system with chopped cane in a smooth and synchronous way with the throwing fins. Bearing in mind this important property, whatever the chopping-feeding system of the throwing means, there will not be any change in the final result.

Figure 6:
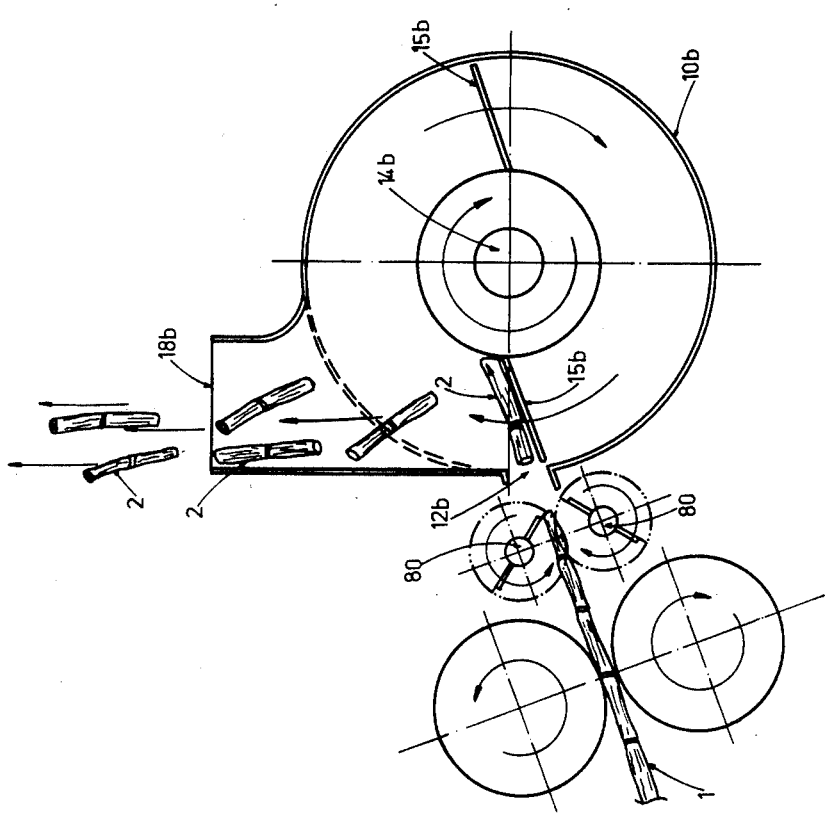
FIG. 6 is a radial vertical section of another embodiment of the chopping-throwing assembly with the feeding of the cane being made transversely to the axis of rotation of the fins, the chopping means being mounted independently with respect to the axis of rotation of the throwing fins.

FIGS. 6 and 7 illustrate a further embodiment wherein the cane 1 is transversally fed with respect to shaft 14a of the throwing fins 15b, which, in this case, rotate in one sense only.

In this assembly, cane 1 is cut into billets 2 by a rotating chopping mechanism 80 which feeds the billets 2 in cylinder 10a, through the feeding opening 12a in the side wall thereof, synchronously with the throwing rotor 146 and fin 15b. Cylinder 10b shows a tangential outlet opening 18b provided so as to enable that the billets fed in the cylinder be immediately collected by a fin 15b and vertically thrown upwardly into the interior of the duct 20b, very similar to duct 20a of FIG. 5, its design having a slight alteration to allow that the vertically-thrown billets be guided to one or the other side of the machine.

The unloading of billets to the left or to the right is accomplished, in this concept, exclusively through a 180° turn of guide-duct 20b.

In FIG. 8 there is illustrated a modification in the throwing means of billets shown in FIG. 6. In this case, throwing rotor 14a–15c rotates reversely propelling billets 2 first downwardly, in the interior of cylinder 10c, to, afterwards, thrown them tangentially upwardly, through the outlet opening 18c equal, in drawing, to opening 18b of FIG. 6. In this concept oscillating throwing fins 15c are utilized, which fins are fixed to shaft 14c through links 90.

The centrifugal force keeps the fins 15c in approximately radial position, this arrangement allowing to reduce the initial impact of the fins over the billets, making the throwing uniform.

Other embodiments utilizing the same principles would be theoretically possible, being herein illustrated, not restrictively, only the embodiments of greater practical workability.

What is claimed is:

1. Chopping-raising-cleaning assembly for sugar cane harvesting machines of the cutting, chopping, cleaning and loading type, comprising a cylinder having an internal surface and provided with a central, longitudinal, horizontal, rotatably driven shaft, at least one radial fin having an external edge mounted on said shaft, at least the external edge thereof abutting the internal surface of the cylinder, said cylinder formed with an entrance opening substantially no higher than the level of the shaft to allow cane billets pre-cut by a suitable chopping mechanism, to be fed transversely to said shaft, said cylinder also formed with a tangential outlet opening for the billets and arranged to allow the billets fed to the cylinder to be launched outside the cylinder by the action of the fins in a generally vertical path, a billet discharge duct in communication with said tangential outlet opening to receive the discharged billets, said duct being bent upward and to one of the sides of the housing generally parallel to said central shaft, means mounting said duct for rotation of about 180° around a vertical axis passing through the center of said outlet opening, said duct formed adjacent its base with two opposed openings, fan means mounted externally of said duct for providing a forced transversal air stream through said opposed openings.

2. Assembly as in claim 1 wherein said outlet opening of the cylinder is located immediately above and downstream, relative to the sense of rotation of the shaft, the entrance opening to allow that the billets picked up by the fins to be substantially immediately launched through the outlet opening.

3. Assembly as in claim 1 wherein said outlet opening of the cylinder is located oppositely to the entrance opening with respect to the central shaft, to allow the billets picked up by the fins to be first pushed downward, at the interior of the cylinder to pass a portion of the internal surface of the latter before they reach said outlet opening.

4. Assembly as in claim 3 wherein said fins are pivotally mounted on the shaft.

5. Assembly as in claim 1 wherein the duct has its unloading opening arranged in its bent upper end and further comprising a deflecting plate for directing and controlling the unloading flux of the billets.

6. Assembly as in claim 5 wherein the deflecting plate is curved to form, when totally closed, a small deposit for said billets.

7. Chopping, raising, cleaning assembly for cane harvesting machines of the cutting, chopping, cleaning and loading type, comprising:
   a generally cylindrical housing provided with a central, longitudinal, horizontal, rotatably mounted shaft,
   at least one radial fin mounted on said shaft, with at least the external edge thereof adjacent the internal surface of the housing,
   an inlet opening provided in one end wall of the cylindrical housing, below the level of said central shaft, to allow cane billets pre-cut by a chopping means, to be fed longitudinally to said housing, and chopping means including at least one knife radially mounted on said central shaft, for rotation in a plane parallel and spaced apart from the lateral edge of the fin closest to the inlet opening to cut the billets into a size within a substantially predetermined range,
   an upper outlet opening formed on the cylindrical wall of said housing into which the billets fed into the housing are launched in an upward path outside the housing by the action of the fin,
   a billet discharge duct in communication with said upper outlet opening to receive the billets discharged into the outlet by the fin, said duct extending upward and to one of the sides of the housing generally transversely to said central shaft,
   means mounting said duct for rotation of about 180° around an upwardly extending axis passing through the center of said outlet opening, said duct formed adjacent its base with an opening, and
   fan means mounted in communication with said duct for providing a forced air stream through said opening adjacent the base to remove unwanted material.

8. Assembly as in claim 7 wherein the upper outlet opening of the housing comprises an inverted trapezoidal shaped hopper formed by upper and lower end portions and lateral faces, having its smaller part thereof open, the lower end poritions of the lateral faces tilted and tangential to the cylindrical wall of the housing and the upper end portions of the lateral faces respectively and substantially parallel to the longitudinal axis of the duct in its two opposed operational positions.

9. Assembly as in claim 7 wherein the billet inlet opening of the housing is provided with external protruding guide means to provide counter-cutting action with the rotating knives.

10. Assembly as in claim 7 further comprising means for feeding the canes with a speed synchronized with the rotation of the knife mounted on the central shaft, for the canes to be cut at regular intervals.

11. Apparatus as in claim 7 wherein there are a plurality of said fins and a corresponding plurality of knives symmetrically arranged around said rotatable shaft so that each fin is angularly equidistant from the knives.

12. Assembly as in claim 7 wherein the duct has its unloading opening arranged in its bent upper end and further comprising a deflecting plate for directing and controlling the unloading flux of the billets, said plate being of cylindrical shape to form, when totally closed, a small hopper for depositing said billets.

13. An assembly as in claim 7 wherein said shaft is reversible in its direction of rotation, said cutting knife having cutting edges on both sides.

14. An assembly as in claim 7 wherein there are two of said outlet openings and ducts and said shaft is reversible in its direction to direct the billets into one or the other of said ducts.

15. Apparatus as in claim 7 wherein there are two ducts each having an inlet and the housing outlet opening is formed to communicate with the inlet of each duct, said rotatable means being reversible to selectively convey the billets into one or the other of the ducts.

16. Apparatus as in claim 15 wherein said housing outlet to said ducts comprises a separate outlet for each duct which is tangential of the housing wall.

17. Apparatus as in claim 16 wherein the housing outlets to the ducts are symmetrically located with respect to an axial plane of the cylindrical housing.

18. Apparatus as in claim 15 further comprising fan means for each said duct for producing an air flow in a direction away from the outlet of the respective duct to clear unwanted material from reaching the duct outlet.

19. Apparatus as in claim 18 wherein the fan means for each said duct is located outside of the path of the billets as they are ejected from the housing into the duct.

20. Apparatus as in claim 15 wherein each said duct extends generally vertically upward from said housing and is tilted outwardly therefrom, each said duct being rotatable with respect to said housing to position its outlet opening.

21. Apparatus as in claim 20 further comprising fan means for each said duct for producing an air flow in a direction away from the outlet of the respective duct to clear unwanted material from reaching the duct outlet.

22. Apparatus as in claim 15 wherein the housing is generally cylindrical, the outlet of the housing to the ducts comprising an inverted trapezoidal shaped hopper with the smaller port thereof open and with each lateral face of the hopper tilted and tangential to the cylindrical housing surface and substantially parallel to the longitudinal axis of a respective duct.

23. Apparatus as in claim 7 wherein the chopper means is internal of the housing.

24. Apparatus as in claim 7 wherein the chopping means is external to said housing.

25. Apparatus as in claim 7 wherein the knives have cutting edges on both sides, which edges are symmetrical with respect to its central radial axis.

* * * * *